W. I. RIVERS.
Cultivator.

No. 24,580.

Patented June 28, 1859.

Witnesses:
D. H. Poob
R. S. Beny

Inventor:
W. I. Rivers

UNITED STATES PATENT OFFICE.

WM. J. RIVERS, OF SUMTER DISTRICT, SOUTH CAROLINA.

IMPROVEMENT IN COTTON-CULTIVATORS.

Specification forming part of Letters Patent No. 24,580, dated June 28, 1859.

*To all whom it may concern:*

Be it known that I, WILLIAM J. RIVERS, of Sumter district, in the State of South Carolina, have invented a new and improved plow for destroying all grass and drilling and pulverizing the ground in which to plant cotton; and I do hereby declare that the following is a full and exact description thereof, reference being had to the accompanying drawings, and to the figures of reference marked thereon—

Figure 1:
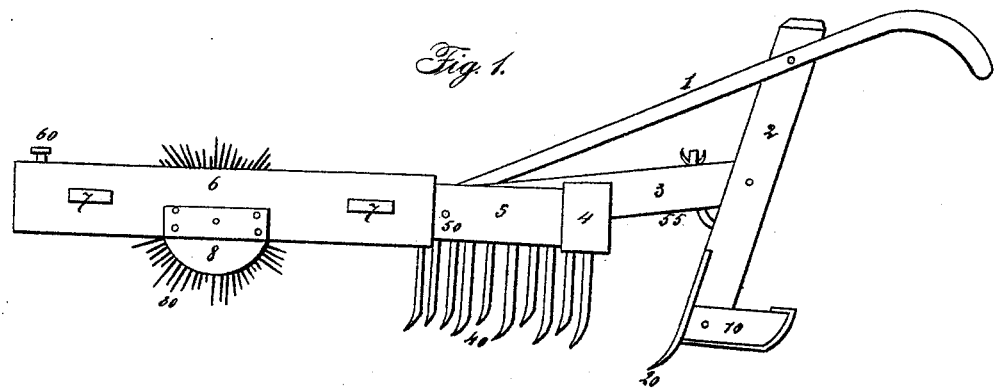
Figure 2:
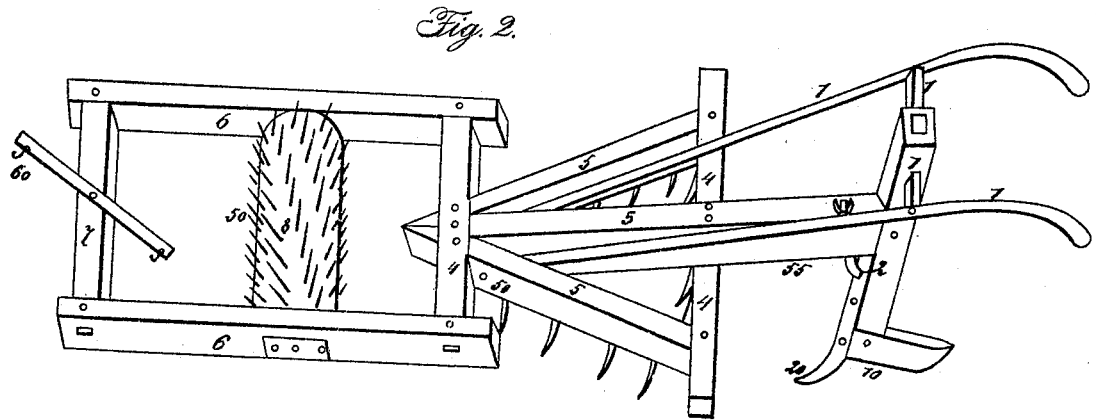

Figure 1 being a side elevation, and Fig. 2 a top view.

No. 1 is the handles, three feet long, two inches by one inch; No. 2, the helve or upright, two feet six inches long, three by two inches; No. 3, the beam, three feet long, three by two inches; No. 4, the beam of harrow, twelve inches long, three by two inches; No. 5, the side of harrow, eighteen inches long, three by two inches; No. 6, the side of roller-frame, two feet long, three by two inches; No. 7, the end of roller-frame, one foot long, three by two inches; No. 8, the roller, ten inches long, six inches in diameter; No. 10, the foot-bar shod with iron, six inches long, three by two inches; No. 20, the drill or plow-iron, six inches long, two inches wide; No. 55, the spindle-iron, with nut on one end one-half inch square; No. 50, the bolt-iron, with nut or tap; No. 40, the teeth in harrow, with nut on upper end; No. 30, the spikes in roller, six inches long, two inches apart, set diagonally; No. 60, the single-tree.

The above plow, as specified, which I call the "Great Joint-Grass-Destroying Cotton-Drill Plow," is to enable the planter to thoroughly pulverize the land—breaking up the clods of earth—at the same time tearing out all grasses of all kinds, being more especially adapted to the joint-grass with which the cotton lands of the Southern States are infested, and at the same time making the drill in which the cotton is to be planted.

What I claim, and desire to secure by Letters Patent, is—

The handles 1, helve 2, beam 3, foot-bar 10, plow 20, harrow 4 5, roller-frame 6 7, and roller 8, when the whole is arranged for joint operation, as described, and for the purposes set forth.

W. J. RIVERS.

Witnesses:
   D. H. POOL,
   N. S. BERRY.